US007564597B2

United States Patent
Chueh (10) Patent No.: US 7,564,597 B2
(45) Date of Patent: Jul. 21, 2009

(54) IMAGE SENSOR AND METHOD THEREFOR (75) Inventor: Chuang-Hua Chueh, Hsinchu (TW)

(73) Assignee: Avision Inc. (TW)

( * ) Notice: Subject to any disclaimer, the term of this patent is extended or adjusted under 35 U.S.C. 154(b) by 1155 days.

(21) Appl. No.: 10/819,147

(22) Filed: Apr. 7, 2004

(65) Prior Publication Data
US 2005/0018254 A1    Jan. 27, 2005

(30) Foreign Application Priority Data
Jul. 21, 2003    (TW) .............................. 92119894 A (51) Int. Cl.
*H04N 1/04* (2006.01)

(52) U.S. Cl. ........................ 358/474; 358/1.2; 358/514; 358/518; 358/520; 382/162; 382/274; 348/223.1; 348/262; 348/145

(58) Field of Classification Search ................ 358/474, 358/497, 500, 504, 505, 506, 509, 475, 513–515, 358/518, 482, 483, 486, 487, 514, 530, 1.2, 358/520, 494; 382/167, 168, 274, 299, 275, 382/318, 319; 348/145, 201, 202, 208.11, 348/223.1, 237, 262, 272, 280
See application file for complete search history.

(56) References Cited

U.S. PATENT DOCUMENTS

| 4,691,114 | A | * | 9/1987 | Hasegawa et al. | 358/474 |
|---|---|---|---|---|---|
| 5,117,295 | A | * | 5/1992 | Smitt | 358/474 |
| 5,144,448 | A | * | 9/1992 | Hornbaker et al. | 348/324 |
| 5,339,107 | A | * | 8/1994 | Henry et al. | 348/270 |
| 5,410,347 | A | * | 4/1995 | Steinle et al. | 348/270 |
| 5,748,803 | A | * | 5/1998 | Schielke | 382/275 |
| 6,054,703 | A | * | 4/2000 | Liu | 250/208.1 |
| 6,178,015 | B1 | * | 1/2001 | Lee et al. | 358/486 |
| 6,307,661 | B1 | * | 10/2001 | Fujibayashi et al. | 359/207 |
| 6,728,418 | B1 | * | 4/2004 | Kumagai et al. | 382/275 |
| 6,961,158 | B2 | * | 11/2005 | Spears | 358/513 |
| 2002/0097330 | A1 | * | 7/2002 | Spears et al. | 348/311 |
| 2002/0100863 | A1 | * | 8/2002 | Spears | 250/208.1 |
| 2003/0007816 | A1 | * | 1/2003 | Ishimaru et al. | 399/367 |
| 2003/0189736 | A1 | * | 10/2003 | Ikeda | 358/475 |
| 2004/0141213 | A1 | * | 7/2004 | Kleiman | 358/474 |
| 2004/0263915 | A1 | * | 12/2004 | Park | 358/461 |
| 2005/0231771 | A1 | * | 10/2005 | Hsu et al. | 358/497 |

* cited by examiner

*Primary Examiner*—Negussie Worku (57) ABSTRACT

An image sensor includes P (P≧2) red-light, P green-light and P blue-light photosensors and is mounted in an image scanning device to expose and read multiple scan lines of a to-be-scanned document. The scanning device includes a driving device for driving the image sensor to move relative to the document. When the image sensor acquires an image of the document, the P red-light photosensors, the P green-light photosensors and the P blue-light photosensors read 3P adjacent scan lines respectively in each exposure. The image sensor continues to read the 3P corresponding adjacent scan lines when the driving device further drives the image sensor to move by P scan lines relative to the document in a specific direction in each step of the driving device. The driving device continues to drive the image sensor to move relative to the document until all the scan lines have been read.

16 Claims, 6 Drawing Sheets

IMAGE SENSOR AND METHOD THEREFOR

This application claims the benefit of Taiwan application Serial No. 092119894, filed Jul. 21, 2003, the subject matter of which is incorporated herein by reference.

BACKGROUND OF THE INVENTION

1. Field of the Invention

The invention relates to an image sensor and a method therefor, and more particularly to an image sensor including at least two sets of photosensors composed of a red-light photosensor, a green-light photosensor and a blue-light photosensor to enhance the resolution in the moving direction of the image sensor, and a method therefor.

2. Description of the Related Art

Figure 1A:
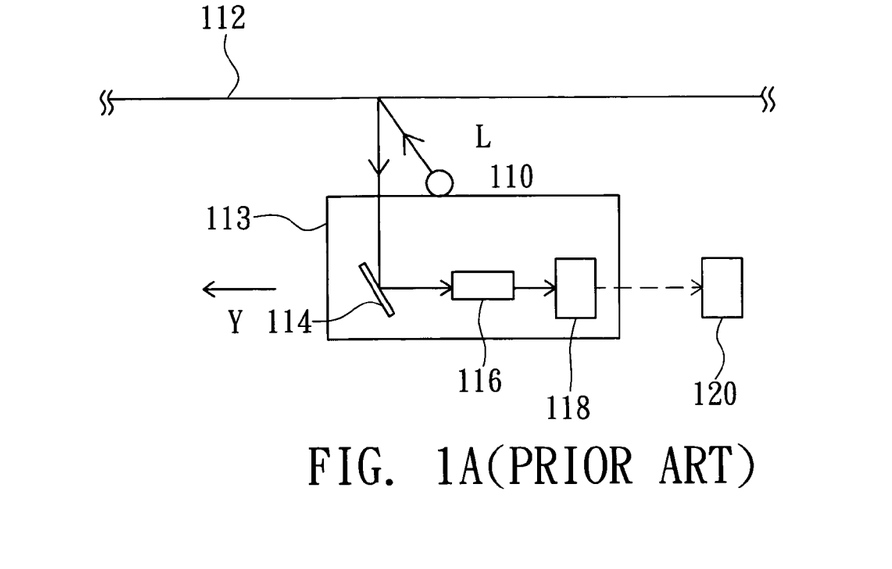
FIG. 1A is a schematic illustration showing an optical path in a conventional scanner for scanning a document.

FIG. 1A is a schematic illustration showing an optical path in a conventional scanner for scanning a document. Taking a reflective type of document as an example, a typical scanner acquires an image by projecting light rays L from a lamp 110 onto a to-be-scanned document 112. Then, the light rays L enter the optical module 113 and is reflected by a reflecting mirror 114, focused by a lens module 116, and then received by a CCD (charge coupled device) module 118, which converts optical signals into electric signals to be transferred to a circuit board 120. Then, a stepping motor (not shown) drives an optical module 113 to sequentially move along the Y-axis until the whole to-be-scanned document 112 is scanned. The image sensing resolution for the CCD module 118 is one important factor for determining the quality of the scanned image.

Figure 1B:
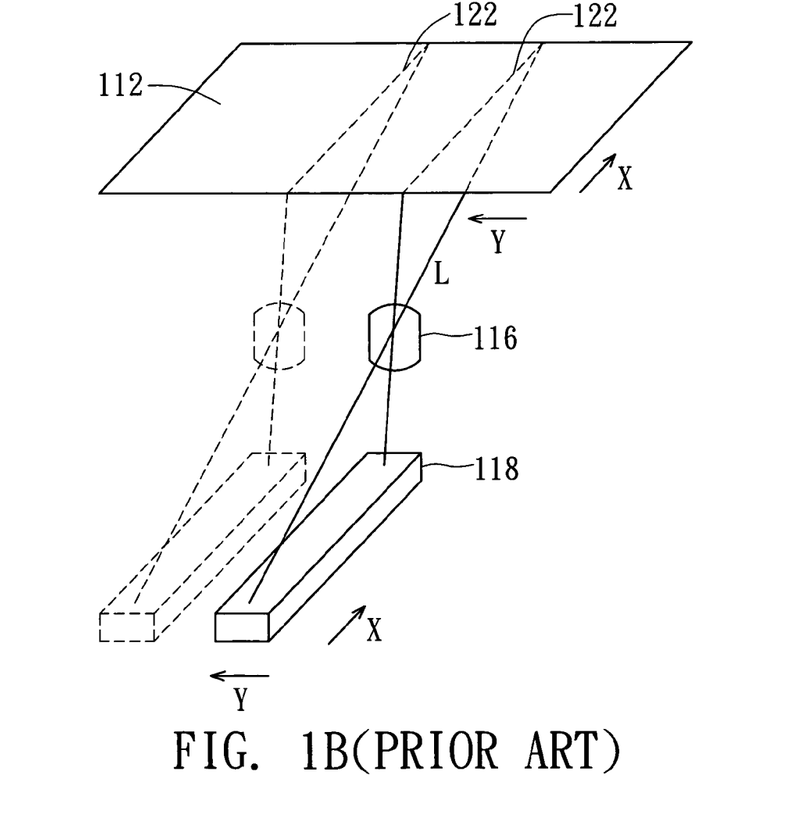
FIG. 1B is a schematic illustration showing the optical paths for the CCD module of FIG. 1A to read the image of the to-be-scanned document.

FIG. 1B is a schematic illustration showing the optical paths for the CCD module 118 of FIG. 1A to read the image of the to-be-scanned document 112. The longitudinal CCD module 118 may read a scan line 122 on a to-be-scanned document 112 in the X-axis direction. The resolution in the X-axis direction is referred to as an optical resolution, and "dpi (dots per inch)" may be used to represent the number of sensing cells (typically photodiodes) in the CCD module 118, receiving light rays reflected from each inch of document. In addition, because the stepping motor drives the optical module 113 to move in the Y-axis direction, the CCD module 118 may read a plurality of scan lines 122 of the to-be-scanned document 112, and the resolution in the Y-axis direction is referred to as a mechanical resolution, which represents the number of steps of the stepping motor for moving the CCD module 118 by one inch, or the number of scan lines read when the CCD module 118 is moved by one inch in the Y-axis direction. Therefore, the resolution of the scanner is generally represented by (X-axis resolution×Y-axis resolution) dpi, such as 600×300 dpi.

Figure 1C:
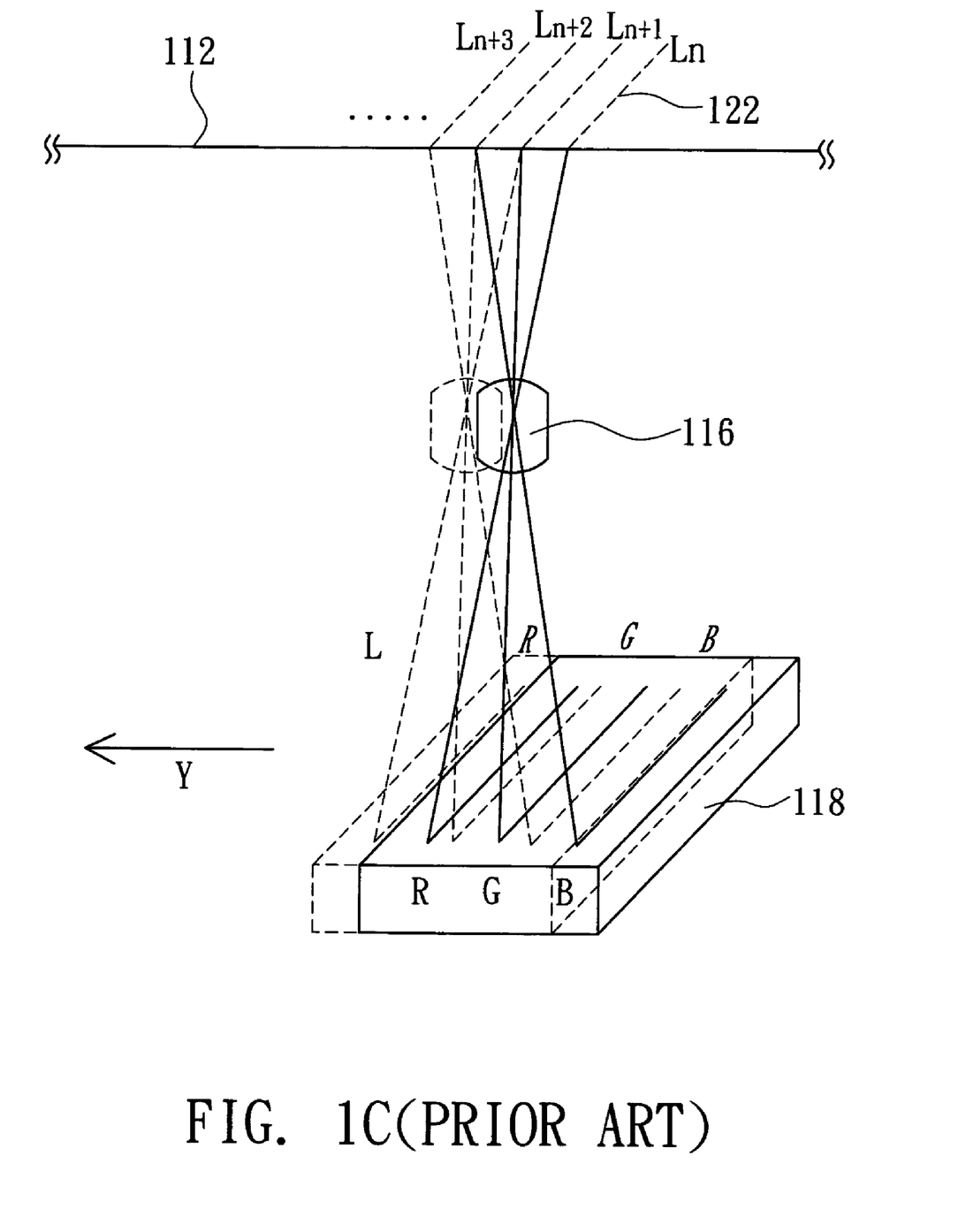
FIG. 1C is a schematic illustration showing the optical paths for the conventional CCD module to read the to-be-scanned document using three CCDs to filter the red-light (R), green-light (G) and blue-light (B)

Furthermore, please refer to FIG. 1C, which is a schematic illustration showing the optical paths for the conventional CCD module to read the to-be-scanned document using three CCDs to filter the red-light (R), green-light (G) and blue-light (B). The typical CCD module 118 further includes RCCD, GCCD and BCCD for sensing red-light, green-light and blue-light components, respectively. The three CCDs and the corresponding lens module 116 are arranged such that the RCCD, GCCD and BCCD may read three adjacent scan lines 122, such as scan lines $L_n$, $L_{n+1}$ and $L_{n+2}$ of FIG. 1C, of the to-be-scanned document 112 at a time. When the stepping motor drives the CCD module 118 to move along the Y-axis to the next step for reading the next scan line, the RCCD, GCCD and BCCD (dashed lines in FIG. 1C) may read the next three adjacent scan lines $L_{n+1}$, $L_{n+2}$ and $L_{n+3}$ at a time, and the processes may be performed analogically, as shown in Table 1. At time $T_i$, the reflected light rays L from three adjacent scan lines $L_n$, $L_{n+1}$ and $L_{n+2}$ may enter RCCD, GCCD and BCCD, respectively. When the CCD module 118 is moved to a next step at time $T_{i+1}$, the reflected light rays L from the three subsequent adjacent scan lines $L_{n+1}$, $L_{n+2}$ and $L_{n+3}$ may further enter RCCD, GCCD and BCCD, respectively, and the processes are performed analogically. It can be understood that the image of the same scan line $L_{n+2}$ may be read by the RCCD, GCCD and BCCD at time $T_i$, $T_{i+1}$ and $T_{i+2}$, respectively. Similarly, other scan lines $L_{n+3}$, $L_{n+4}$ ... may also be read in the same manner. The three primary colors of R, G, B may be mixed to form colored light rays, and a complete colored image may be obtained accordingly.

TABLE 1

|  | $L_n$ | $L_{n+1}$ | $L_{n+2}$ | $L_{n+3}$ | $L_{n+4}$ | $L_{n+5}$ | $L_{n+6}$ |
|---|---|---|---|---|---|---|---|
| $T_i$ | R | G | B |  |  |  |  |
| $T_{i+1}$ |  | R | G | B |  |  |  |
| $T_{i+2}$ |  |  | R | G | B |  |  |
| $T_{i+3}$ |  |  |  | R | G | B |  |
| $T_{i+4}$ |  |  |  |  | R | G | B |

With the progress of the technology and users' demands on the higher colored image quality, manufactures of scanners have been continuing improving the resolutions of their newly developed products. As described above, the scanning resolution of the scanner, with respect to the document, depends on the resolutions in both of the X-axis and Y-axis directions. Thus, both resolutions, in the X-axis direction and in the Y-axis direction, have to be enhanced. However, typically the resolution in the X-axis direction is enhanced by increasing the number of sensing cells contained in each of the three CCDs (RCCD, GCCD, BCCD), and the resolution in the Y-axis direction is enhanced by an improved stepping motor and an improved lamp 110.

Figure 1D:
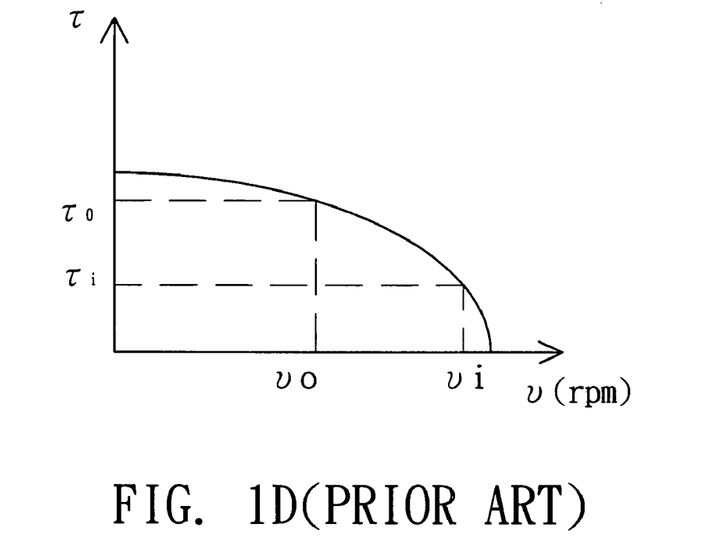
FIG. 1D is a graph showing the relationship between the torque T and rotating speed u of a stepping motor in a prior art scanner.

For example, a scanner for scanning 8"×11" documents at a scanning speed of 30 ppm will be described. In other words, the scanner needs only two seconds to scan a page of document having a length of 11 inches. The stepping motor for the scanner with the Y-axis resolution of 300 dpi has a transmission frequency of 3300/2 (steps/seconds) because 3300 scan lines have to be scanned, and the holding time (scan time) in each step is equal to 2/3300 (seconds/steps). Consequently, the exposure time of the sensing cells is equal to 2/3300 seconds. When the resolution is enhanced to 600 dpi while at the constant scanning speed of 30 ppm, the transmission frequency for the stepping motor should be changed to 6600/2 (steps/seconds) because the number of scan lines in each page is increased to 6600. That is, the rotating speed of the stepping motor has to be doubled. At this time, the scan time per scan line is shortened to 1/3300 (second/steps). That is, the exposure time of the sensing cells is shortened to 1/3300 (seconds). However, the typical maximum torque T is exponentially inversely proportional to the rotating speed u(rpm) of the stepping motor, as shown in the curve of FIG. 1D. When the rotating speed of the motor increases from, for example, $u_o$ to $u_i$, the maximum torque that can be produced by the motor decreases from $T_o$ to $T_i$. At this time, the stepping motor may not stably drive the scanning module, and a larger or a more expensive stepping motor has to be used. In addition, when the holding time of the stepping motor is shortened, the exposure time for the sensing cells is also shortened relatively. Thus, the brightness of the lamp 110 has to be increased by, for example, increasing the number of lamps or applying a high voltage to the lamp, which economically increases the cost of production or shortens the lifetime of the lamp.

The above-mentioned scanner is an example of flatbed scanner where the to-be-scanned document 112 is stationary and placed on a scan platen and the stepping motor drives the optical module 113 to move in the Y-axis direction. The same problem also exists in a sheet-fed scanner where the optical module 113 is stationary and the stepping motor drives the to-be-scanned document 112 to move forward because a relative movement between the to-be-scanned document 112 and the optical module 113 also exists. For the sake of clarification, the invention only illustrates the scan mode of the flatbed scanner, but one of ordinary skill in the art may understand that the invention also applies to the scan mode of the sheet-fed scanner.

SUMMARY OF THE INVENTION

It is therefore an object of the invention to provide an image sensor and a method therefor, wherein at least one set of a red-light photosensor, a green-light photosensor and a blue-light photosensor is added in conjunction with a proper arrangement of the lens module. Thus, the number of scan lines read by a CCD module in the moving direction of the CCD module in the same exposure time may be at least doubled to enhance the scan resolution without improving the stepping motor or increasing the lamp brightness.

The invention achieves the above-identified object by providing an image sensor for reading a number of scan lines of a to-be-scanned document and thus acquiring the image. The image sensor includes K ($2 \leqq K$) red-light photosensors, K green-light photosensors and K blue-light photosensors. When the image sensor acquires a colored image of the to-be-scanned document, the K red-light photosensors, the K green-light photosensors and the K blue-light photosensors read 3K adjacent scan lines respectively in each exposure.

The image sensor reads 3K corresponding adjacent scan lines in each step of the motor, where the motor moves the image sensor by K scan lines relative to the to-be-scanned document along a specific axis, and continues reading until all the scan lines have been read. Thus, each scan line may be sequentially read by a red-light photosensor, a green-light photosensor, and a blue-light photosensor among the 3K photosensors. So, the scan resolution may be increased to K times of the original scan resolution without increasing the motor speed and the scanning speed.

The invention also achieves the above-identified object by providing an image reading method applied to the above-mentioned image sensor to read a number of scan line in the to-be-scanned document and thus to acquire the image. The image reading method includes the steps of: reading 3K scan lines respectively with the K red-light photosensors, the K green-light photosensors, and the K blue-light photosensors; moving the image sensor by K scan lines relative to the to-be-scanned document along a specific axis in a step of a motor of the image scanning device; reading 3K corresponding adjacent scan lines; and repeating the relative movement between the image sensor and the to-be-scanned document along the specific axis until all of the scan lines have been read. So, the scan resolution may be increased to K times of the original scan resolution without increasing the motor speed and the scanning speed.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 2A:
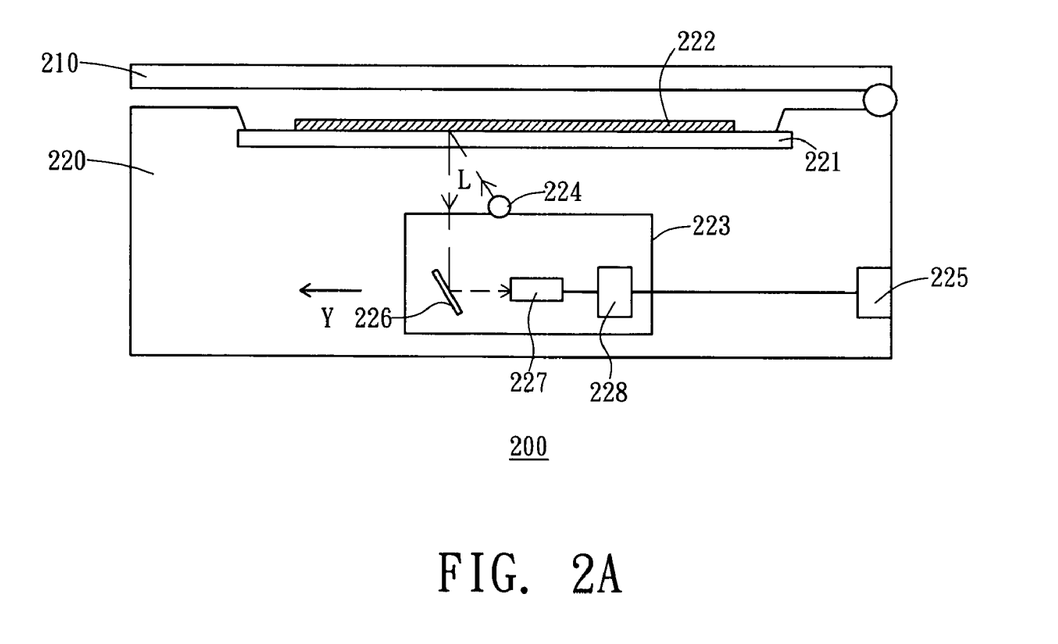
FIG. 2A is a schematic illustration showing an image sensor for a scanner according to a preferred embodiment of the invention.

The image sensor of the invention used in a CCD module of a scanner is described as an example to illustrate how to enhance the scan resolution. FIG. 2A is a schematic illustration showing an image sensor for a scanner according to a preferred embodiment of the invention. Referring to FIG. 2A, a scanner 200 includes an upper cover 210 and a base 220, which includes a scan platen 221, an optical module 223 and a circuit board 225. The scan platen 221 is provided for a to-be-scanned document 222 (e.g., a reflective type of document) to be placed thereon. The optical module 223 includes a light source 224, a reflecting mirror 226, a lens module 227 and a CCD module 228. When the document is scanned, light rays L are projected from the light source 224 of the optical module 223 onto the to-be-scanned document 222. Then, the light rays L reflected by the to-be-scanned document 222 enter the optical module 223. Then, the light rays L are reflected by the reflecting mirror 226, focused by the lens module 227, and received by the CCD module 228, which converts optical signals into electric signals to be output via the circuit board 225. Subsequently, a stepping motor (not shown) drives the optical module 223 to move step by step in a Y-axis direction and to enable the CCD module 228 to read the image of the to-be-scanned document 222 in the Y-axis direction until the whole page of the image is scanned.

Figure 2B:
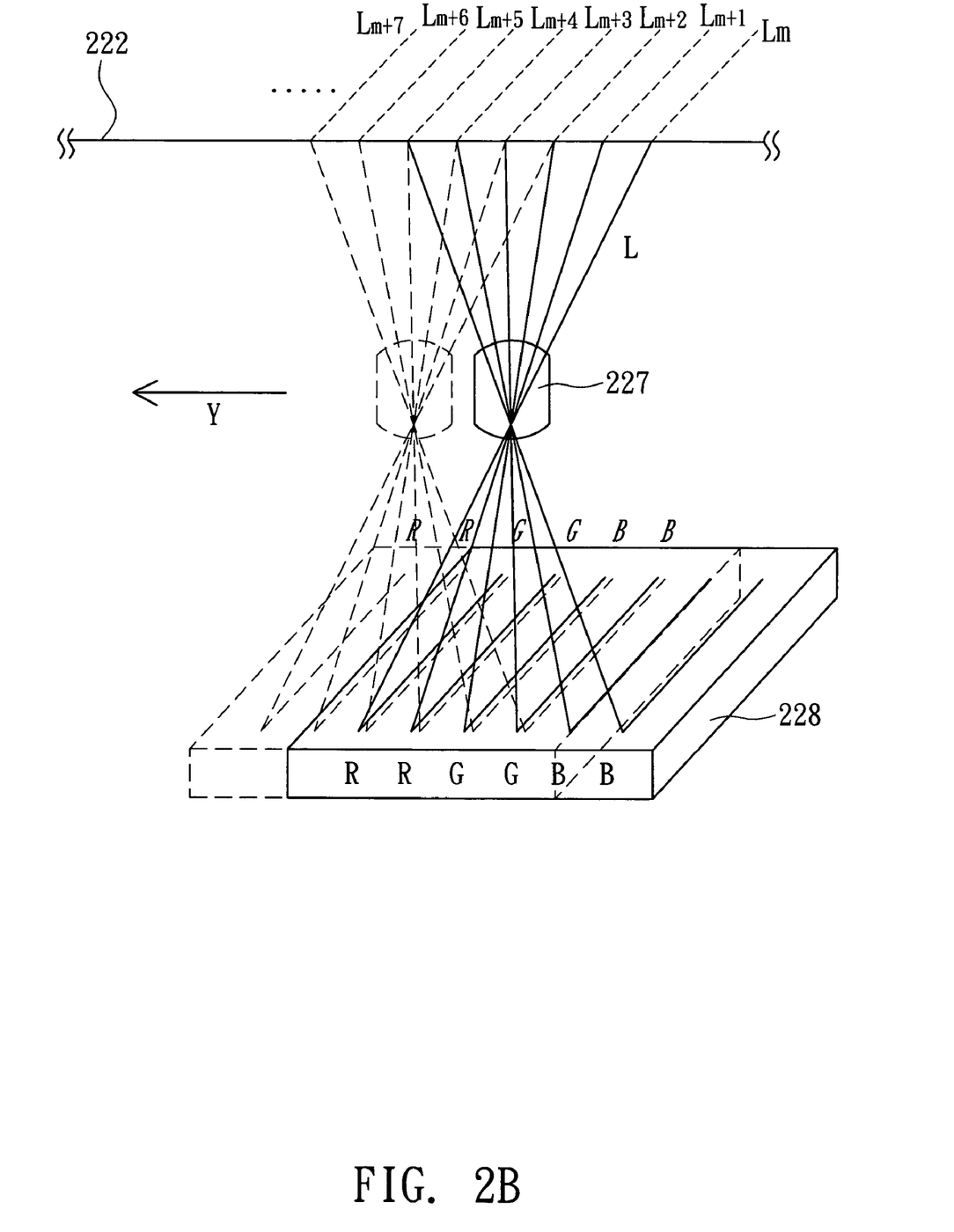
FIG. 2B is a schematic illustration showing the CCD module of FIG. 2A for scanning a to-be-scanned document.

FIG. 2B is a schematic illustration showing the CCD module of FIG. 2A for scanning a to-be-scanned document. Under the precondition of not increasing the motor rotating speed and lamp brightness, the invention directly improves the design of the CCD module 228 in order to enhance the scan resolution in the Y-axis direction. Referring to FIG. 2B, the CCD module 228 includes 3P CCDs sequentially composed of P red-light CCDs, P-green-light CCDs and P blue-light CCDs, i.e. RCCD, RCCD, GCCD, GCCD, BCCD and BCCD. where P is a positive integer and P=2 in this embodiment. That is, an additional set of RCCD, GCCD, BCCD is added to the prior art. So, the CCDs of the invention may read six (2P) adjacent scan lines $L_m$, $L_{m+1}$, $L_{m+2}$, $L_{m+3}$, $L_{m+4}$ and $L_{m+5}$ at a time. The lens module 227 may be configured such that the six CCDs may read twice as many scan lines of the document per inch as those in the prior art. That is, the Y-axis resolution in the invention is twice of that in the prior art. Unlike the prior art wherein the CCD module is moved by one scan line in each step of the stepping motor, the CCD module 228 is driven to move by two (P=2) scan lines in each step of the stepping motor. In other words, the six subsequent scan lines, as shown in the dashed lines of FIG. 2B, to be read are $L_{m+2}$, $L_{m+3}$, $L_{m+4}$, $L_{m+5}$, $L_{m+6}$ and $L_{m+7}$. The processes may be performed analogically, as shown in the following Table 2.

TABLE 2

|  | $L_m$ | $L_{m+1}$ | $L_{m+2}$ | $L_{m+3}$ | $L_{m+4}$ | $L_{m+5}$ | $L_{m+6}$ | $L_{m+7}$ | $L_{m+8}$ | $L_{m+9}$ |
|---|---|---|---|---|---|---|---|---|---|---|
| $T_i$ | R | R | G | G | (B) | (B) |  |  |  |  |
| $T_{i+1}$ |  |  | R | R | (G) | (G) | (B) | (B) |  |  |
| $T_{i+2}$ |  |  |  |  | (R) | (R) | (G) | (G) | B | B |
| $T_{i+3}$ |  |  |  |  |  |  | (R) | (R) | G | G |

At time $T_i$ (i-th reading), the light rays L reflected by the six adjacent scan lines $L_m$, $L_{m+1}$, $L_{m+2}$, $L_{m+3}$, $L_{m+4}$ and $L_{m+5}$ are received by the RCCD, RCCD, GCCD, GCCD, BCCD and BCCD. Then, at time $T_{i+1}$, the CCD module 228 is moved by two scan lines to make the RCCD, RCCD, GCCD, GCCD, BCCD and BCCD receive the light rays L reflected by the adjacent six scan lines $L_{m+2}$, $L_{m+3}$, $L_{m+4}$, $L_{m+5}$, $L_{m+6}$ and $L_{m+7}$. The processes may be performed analogically until the whole document has been scanned. It is understood that the same scan line $L_{m+4}$ or $L_{m+5}$ may be read by the BCCD, GCCD and RCCD at time $T_i$, $T_{i+1}$ & $T_{i+2}$, the same rule may be applied to the other scan lines $L_{m+6}$, $L_{m+7}$ . . . , analogically. Since the three primary colors of R, G and B may be mixed to form a colored light ray, the complete colored image may be acquired.

Of course, the four initial scan lines $L_1$, $L_2$, $L_3$ and $L_4$ cannot form a complete image signal constituting all of R, G and B color components. Thus, the optical module 223 may be designed to start to generate signals of the to-be-scanned document 222 from the fifth scan line. The above-mentioned six CCDs may be arranged such that two RCCDs are adjacent to each other, two GCCDs are adjacent to each other, and two BCCDs are adjacent to each other. In addition to the above-mentioned arrangement order of (RCCD, RCCD, GCCD, GCCD, BCCD, BCCD), the arrangement order of (RCCD, RCCD, BCCD, BCCD, GCCD, GCCD), (GCCD, GCCD, RCCD, RCCD, BCCD, BCCD), or the like, also may be employed. Also, three CCDs including the RCCD, GCCD, and BCCD may be arranged and combined to form a first CCD set in advance, and then a second CCD set duplicating from the first CCD set is arranged after the first CCD set. For example, the arrangement order may be (RCCD, GCCD, BCCD, RCCD, GCCD, BCCD), (RCCD, BCCD, GCCD, RCCD, BCCD, GCCD), or the like. In addition, the three CCDs including the RCCD, GCCD and BCCD may be arranged and combined to form a first CCD set, and then a second CCD set mirroring from the first CCD set is arranged after the first CCD set. For example, the arrangement order may be (RCCD, GCCD, BCCD, BCCD, GCCD, RCCD), (BCCD, RCCD, GCCD, GCCD, RCCD, BCCD), or the like. In any of the above-mentioned arrangement order, the reflected light rays from the same scan line in the three sequential image reading may be just respectively received by the RCCD, GCCD and BCCD so as to obtain the full color image.

For example, a scanner for scanning 8"×11" documents at a scanning speed of 30 ppm with a Y-axis resolution of 600 dpi will be described. In other words, the scanner needs only two seconds to scan a page of document having a length of 11 inches, and 600 scan lines have to be read per inch in the Y-axis direction. According to the image sensor of the invention, the stepping motor has to drive the optical module of the scanner to move by two scan lines in one step because 6600 scan lines have to be scanned. So, the transmission frequency is 3300/2 (steps/second), and the holding time in each step is 2/3300 (seconds/steps), which are the same as those in the prior art scanner with the resolution of 300 dpi. That is, the rotating speed of the stepping motor and the brightness of the light source 224 need not to be increased. Using additional set of RCCD, GCCD and BCCD of the invention may double the conventional scan resolution.

Similarly, if the resolution is to be kept at 300 dpi and the scan speed is increased from 30 ppm to 60 ppm, the number of scan lines in each page is 3300 using the sensor and method of the invention. Each page has to be scanned in one second to reach the scan speed of 60 ppm. The stepping motor of the invention may move the sheet or the scan module by two scan lines in each step. So, the transmission frequency of the stepping motor is 3300/2 (steps/seconds), and the holding time in each step is 2/3300 (seconds/steps), which are the same as those in the prior art scanner having the scan speed of 30 ppm and the resolution of 300 dpi. In addition or in other words, if the scan speed and the resolution are to be increased from 30 ppm and 300 dpi to 60 ppm and 600 dpi, using the design of the invention which adds at least one set of RCCD, GCCD and BCCD only needs to double the rotating speed of the stepping motor and the lamp brightness. Compared to the prior art, which needs to quadruple the speed and brightness, the invention is more easily to be achieved.

Although the above-mentioned to-be-scanned document is a reflective type of document, it may as well be a transmissive type of document. In this case, the light source 224 may be mounted onto the upper cover 210 to transmit light rays through the to-be-scanned document, and the transmitted light rays are received by the CCD module 228. Thus, the object of enhancing the resolution of the invention still can be achieved.

Figure 3:
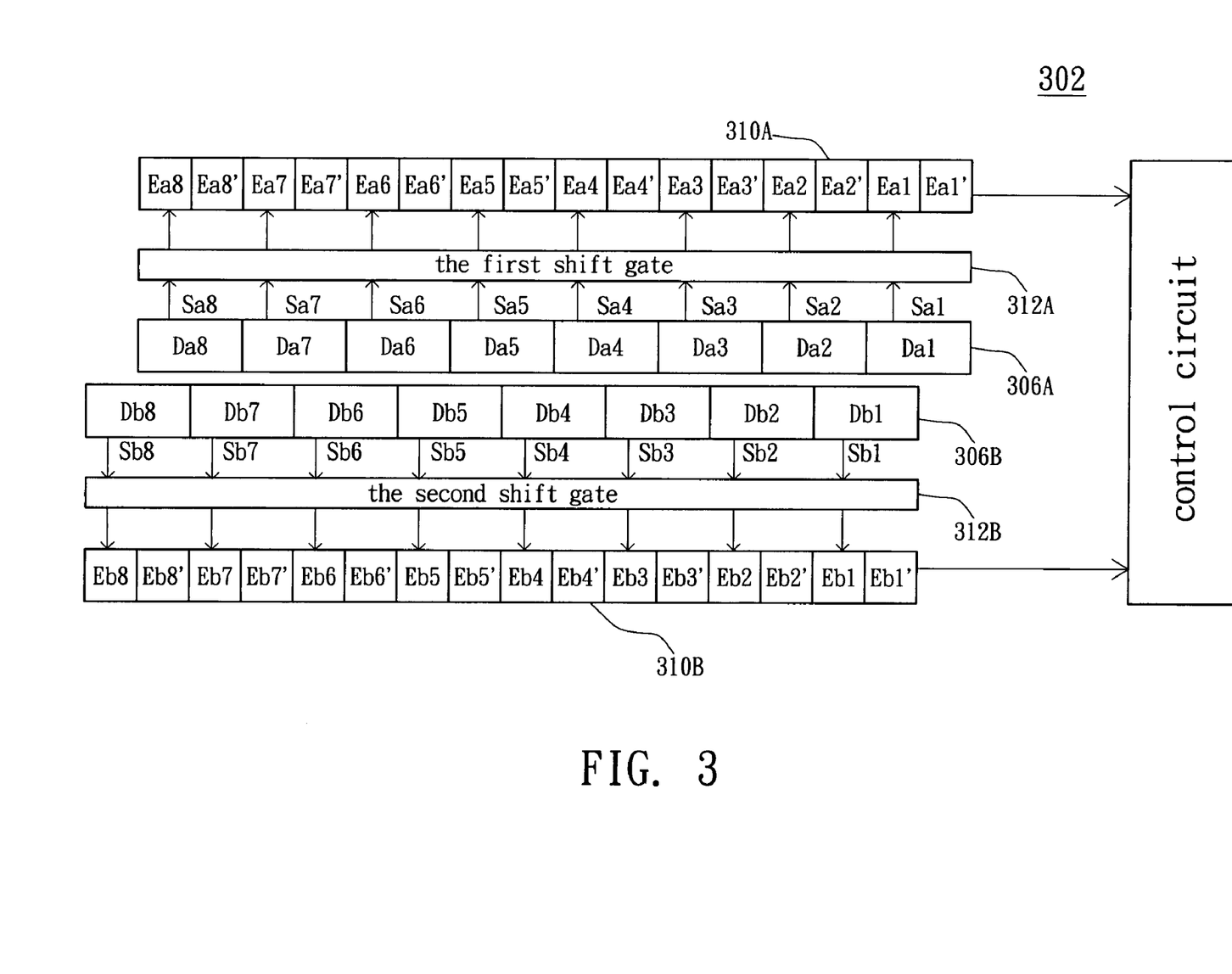
FIG. 3 is a schematic illustration showing a staggered type CCD module.

Although the image sensor is a CCD module in the above-mentioned preferred embodiment of the invention, it also may be a CIS (Contact Image Sensor) module or a CMOS (Complementary Metal Oxide Semiconductor) module without departing from the technical range of the invention. In addition, the image sensor of the invention also may be applied to a staggered type CCD module, as shown in FIG. 3. The CCD module 302 includes a first CCD shift register 310A, a second CCD shift register 310B, a first photosensor cell set 306A and a second photosensor cell set 306B. Each of the first CCD shift register 310A and the second CCD shift register 310B is composed of multiple CCD devices. For example, the first shift register 310A is composed of multiple first CCD devices Ea and multiple second CCD devices Ea' staggered with the first CCD devices Ea. Each of the first photosensor cell set 306A and the second photosensor cell set 306B includes multiple first and second photosensor cells Da and Db for receiving first and second optical signals (not shown) and generating multiple corresponding first and second signal charges Sa and Sb. The first and second signal charges Sa and Sb are transferred to the first and second CCD devices Ea and Ea' under the controls of the first and second shift gates 312A and 312B. Using the staggered arrangement of the two photosensor cell sets 306A and 306B may enhance the scan resolution in the X-axis direction. Employing the invention in conjunction with the staggered type CCD module may achieve the enhancement of the Y-axis resolution without enhancing the motor specification and the light source brightness.

Figure 4:
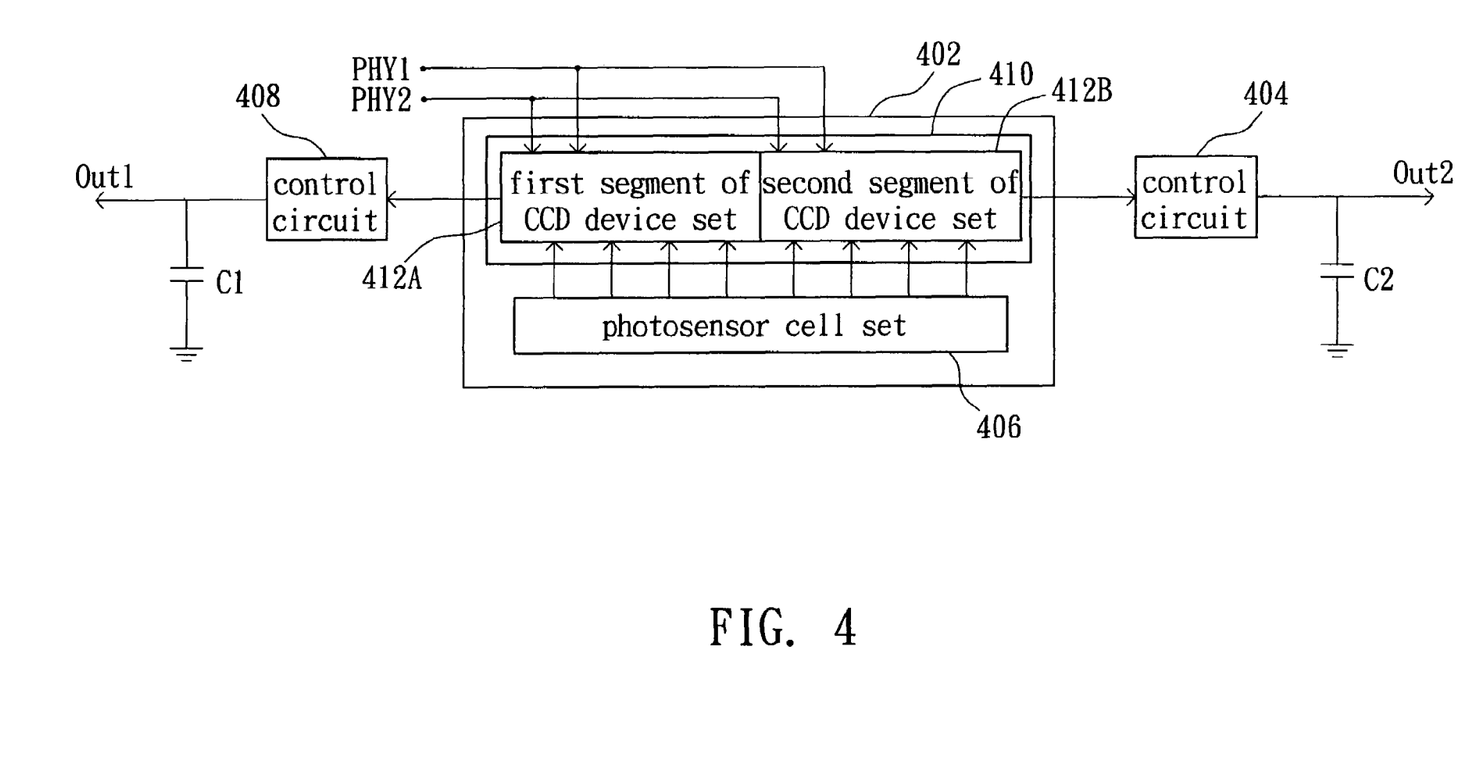
FIG. 4 is a schematic illustration showing a CCD module having bi-directional outputs.

The image sensor of the invention also may be applied to a CCD module with bi-directional outputs, as shown in FIG. 4. The CCD module 402 includes a photosensor cell set 406 and a CCD shift register 410. The photosensor cell set 406 receives optical signals and generates multiple corresponding signal charges. The CCD shift register 410 is composed of a first segment of CCD device set 412A and a second segment of CCD device set 412B. The first and second segments of CCD device sets 412A and 412B receive a portion of signal charges and output the signal charges to charge storage devices via control circuits 408 and 404, respectively. The shift register 410 is divided into at least two segments, each of which receives the signal charge output to increase the scanning speed. Employing the invention in conjunction with the CCD module having bi-directional outputs may achieve the enhancement of the Y-axis resolution without enhancing the motor specification and the light source brightness.

The image sensor according to the preferred embodiment of the invention has the following advantages. Adding one set of a red-light photosensor, a green-light photosensor, and a blue-light photosensor to the original image sensor to form six photosensors, and properly arranging the photosensors in conjunction with the placement of the lens module may double the number of scan lines read per inch of the to-be-scanned document and further controlling the stepping motor to move the optical module by two scan lines relative to the document in each step. With such design, the resolution in the Y-axis direction can be effectively enhanced even without using a stepping motor of better quality or of higher cost, or increasing the lamp brightness.

In the above-mentioned embodiment, although adding a set of a red-light photosensor, a green-light photosensor, and a blue-light photosensor is described as an example (P=2), the invention is not limited thereto. Thus, two or more than two sets of a red-light photosensor, a green-light photosensor, and a blue-light photosensor may also be added (i.e. P is 3 or larger than 3)in conjunction with proper arrangement in the order of, for example. in the case of P=3, the red-light one, the green-light one, the blue-light one, the red-light one, the green-light one, the blue-light one, the red-light one, the green-light one, and the blue-light one. In this case, as the stepping motor moves by one step, the optical module have to be shifted by three (P=3) scan lines to achieve the object of enhancing the scan resolution without departing from the range of the invention.

In addition to the red-light photosensors, the green-light photosensors and the blue-light photosensors, the CCD module for some currently used color scanners also has a black-and-white image sensor. When a user chooses to scan the to-be-scanned document in a black-and-white scanning mode using this color scanner, it is preferred to utilize the black-and-white image sensor to acquire the image of the document for better results could be obtained in the black-and-white mode. In the scanner using such a kind of CCD module, if this invention is employed and two sets of black-and-white image sensors are disposed in the CCD module, two scan lines at a time can be read in the black-and-white image scanning mode and the object of enhancing the scan resolution and reducing the production cost may be achieved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image sensor mounted in an image scanning device to expose and read a plurality of scan lines of a to-be-scanned document, the image scanning device comprising a motor for driving the image sensor to move relative to the to-be-scanned document along a specific axis, the image sensor comprising:
   P red-light photosensors;
   P green-light photosensors; and
   P blue-light photosensors, wherein:
   P is a positive integer, $P \geq 2$;
   when the image sensor acquires a colored image of the to-be-scanned document, the P red-light photosensors, the P green-light photosensors and the P blue-light photosensors read 3P adjacent scan lines respectively in each exposure;
   the image sensor reads 3P corresponding adjacent scan lines in each step of the motor, where the motor moves the image sensor by P scan lines relative to the to-be-scanned document along the specific axis, and continues reading until all the scan lines have been read.

2. The image sensor according to claim 1, further comprising:
   P black-and-white image sensors, wherein:
   when the image sensor is operated to acquire a black-and-white image of the to-be-scanned document, the P black-and-white image sensors read P adjacent scan lines in each exposure;
   the image sensor reads P corresponding adjacent scan lines in each step of the motor, where the motor moves the image sensor by P scan lines relative to the to-be-scanned document along the specific axis, and continues reading until all the scan lines have been read.

3. The image sensor according to claim 1, wherein the to-be-scanned document is a reflective type of document.

4. The image sensor according to claim 1, wherein the to-be-scanned document is a transmissive type of document.

5. The image sensor according to claim 1 being a CCD (Charge Coupled Device) module.

6. The image sensor according to claim 5 being a staggered type CCD module.

7. The image sensor according to claim 5 being a CCD module with bi-directional outputs.

8. The image sensor according to claim 1 being a CIS (Contact Image Sensor) module.

9. The image sensor according to claim 1 being a CMOS (Complementary Metal Oxide Semiconductor) module.

10. An image reading method employed in an image scanning device, which comprises an image sensor for exposing and reading a plurality of scan lines of a to-be-scanned document, the image sensor comprising P ($P \geq 2$) red-light photosensors, P green-light photosensors and P blue-light photosensors, where P is a positive integer, the image reading method comprising the steps of:
   reading 3P scan lines respectively with the P red-light photosensors, the P green-light photosensors and the P blue-light photosensors;
   moving the image sensor by P scan lines relative to the to-be-scanned document along a specific axis in a step of a motor of the image scanning device;
   reading 3P corresponding adjacent scan lines; and
   repeating the relative movement between the image sensor and the to-be-scanned document along the specific axis until all of the scan lines have been read.

11. The method according to claim 10, wherein the image sensor further comprises P black-and-white image sensors, and when the image sensor is operated to acquire a black-and-white image of the to-be-scanned document, the image reading method comprises the steps of:
  reading P scan lines with the P black-and-white image sensors;
  moving the image sensor by P scan lines relative to the to-be-scanned document along the specific axis in a step of a motor of the image scanning device;
  reading P corresponding adjacent scan lines; and
  repeating the relative movement between the image sensor and the to-be-scanned document along the specific axis until all of the scan lines have been read.

12. The method according to claim 10, wherein the image sensor is a CCD module.

13. The method according to claim 10, wherein the image sensor is a staggered type CCD module.

14. The method according to claim 10, wherein the image sensor is a CCD module with bi-directional outputs.

15. The method according to claim 10, wherein the to-be-scanned document is a reflective type of document.

16. The method according to claim 10, wherein the to-be-scanned document is a transmissive type of document.

* * * * *